United States Patent
Pritchard et al.

(10) Patent No.: US 10,988,022 B2
(45) Date of Patent: Apr. 27, 2021

(54) ELECTRO-MECHANICAL ON DEMAND (EMOD) TRANSFER CASE—DUAL DRIVE GEAR AND SHIFT FORK CONSOLIDATION

(71) Applicant: BorgWarner Inc., Auburn Hills, MI (US)

(72) Inventors: Larry A. Pritchard, Macomb, MI (US); Gurmeet Singh Bedi, Rochester Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 127 days.

(21) Appl. No.: 16/273,903

(22) Filed: Feb. 12, 2019

(65) Prior Publication Data
US 2020/0254872 A1   Aug. 13, 2020

(51) Int. Cl.
| | |
|---|---|
| B60K 17/346 | (2006.01) |
| B60K 17/35 | (2006.01) |
| F16H 61/04 | (2006.01) |
| F16H 59/04 | (2006.01) |
| F16H 63/30 | (2006.01) |

(52) U.S. Cl.
CPC ......... B60K 17/3467 (2013.01); B60K 17/35 (2013.01); F16H 59/041 (2013.01); F16H 61/0403 (2013.01); F16H 63/304 (2013.01)

(58) Field of Classification Search
CPC ... B60K 17/3467; B60K 17/35; F16H 63/304; F16H 59/041; F16H 2063/324; F16H 3/22; F16H 2061/2846
See application file for complete search history.

(56) References Cited

U.S. PATENT DOCUMENTS

| | | | | |
|---|---|---|---|---|
| 9,475,385 | B1 * | 10/2016 | Pritchard | B60K 17/344 |
| 2012/0037472 | A1 * | 2/2012 | Rosemeier | F16H 61/32 |
| | | | | 192/66.1 |
| 2015/0158383 | A1 * | 6/2015 | Mastie | B60K 17/3467 |
| | | | | 475/204 |
| 2016/0061321 | A1 * | 3/2016 | Chung | B05B 7/00 |
| | | | | 428/663 |
| 2017/0037961 | A1 * | 2/2017 | Pritchard | F16H 37/02 |
| 2017/0232840 | A1 * | 8/2017 | Pritchard | B60K 23/0808 |
| | | | | 74/665 GE |

\* cited by examiner

Primary Examiner — Stacey A Fluhart
(74) Attorney, Agent, or Firm — Burris Law, PLLC

(57) ABSTRACT

A dual drive gear of an actuation assembly for a transfer case includes an annular disk, a dual drive gear hub, and a sense plate. The annular disk has an inner periphery and an outer periphery. The outer periphery defines a plurality of teeth projecting radially outward. The dual drive gear hub is attached to the inner periphery of the annular disk and has an inner surface that defines a bore extending through a center of the dual drive gear. The dual drive gear hub includes a pair of curved walls projecting from a first axial end face of the annular disk. The sense plate projects from a second axial end face of the annular disk opposite of the first axial end face and includes a plurality of curved wall sections. The annular disk, the dual drive gear hub, and the sense plate are formed together as a single piece.

15 Claims, 15 Drawing Sheets

ELECTRO-MECHANICAL ON DEMAND (EMOD) TRANSFER CASE—DUAL DRIVE GEAR AND SHIFT FORK CONSOLIDATION

FIELD

The present disclosure relates to electro-mechanical on demand (EMOD) transfer cases, and more particularly, to consolidation of a dual drive gear and a shift fork in EMOD transfer cases.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A transfer case transfers power from a transmission of a vehicle to front and rear axles of a vehicle via drive shafts. A transfer case typically operates in multiple modes, such as two wheel drive (2 WD) and four-wheel drive (4 WD), and multiple ranges, such as low, high, and neutral. Vehicles with a manual transfer case typically include a selector lever that is mechanically coupled to the transfer cases to enable a driver to manually shift the transfer case between modes and ranges. Vehicles with an EMOD transfer case typically include a switch or button that enables a driver to control an electric motor to automatically shift the transfer case between modes and ranges.

An EMOD transfer case typically includes an input shaft, a first output shaft, a second output shaft, a planetary gear set, a range shift mechanism, a mode clutch, a clutch actuator, a dual drive gear assembly, and an electric shift motor. When the transfer case is in high, the range shift mechanism connects the first output shaft directly to the input shaft. When the transfer case is in low, the range shift mechanism connects the first output shaft to the input shaft through the planetary gear set. When the transfer case is in 4 WD, the mode clutch couples the second output shaft to the first output shaft. When the transfer case is in 2 WD, the mode clutch decouples the second output shaft from the first output shaft.

The shift motor rotates the dual drive gear assembly via a reduction gear set to actuate the range shift mechanism and the mode clutch. The clutch actuator converts the rotational force of the dual drive gear assembly into an axial force that applies the mode clutch or releases the mode clutch. The range shift mechanism converts the rotational force of the dual drive gear assembly into an axial force that axially translates a reduction hub splined to the first output shaft. When the transfer case is shifted to high, the reduction hub is translated to a first axial position in which external splines on the reduction hub engage internal splines on the input shaft. When the transfer case is shifted to low, the reduction hub is translated to a second axial position in which the external splines on the reduction hub engage internal splines on a carrier gear of the planetary gear set. When the transfer case is shifted to neutral the reduction hub is translated to a third axial position between the first and second axial positions. In the third axial position, the external splines on the reduction hub do not engage the internal splines on the input shaft or the internal splines on the carrier gear.

SUMMARY

An example of a dual drive gear of an actuation assembly for a transfer case includes an annular disk, a dual drive gear hub, and a sense plate. The annular disk has an inner periphery and an outer periphery. The outer periphery defines a plurality of teeth projecting radially outward and configured to engage teeth on a first gear of a plurality of reduction gears that couple the dual drive gear to a shift motor. The dual drive gear hub is attached to the inner periphery of the annular disk and has an inner surface that defines a bore extending through a center of the dual drive gear. The dual drive gear hub includes a pair of curved walls spaced apart from one another around the inner periphery of the annular disk and projecting from a first axial end face of the annular disk. The sense plate projects from a second axial end face of the annular disk opposite of the first axial end face and includes a plurality of curved wall sections disposed about the outer periphery of the annular disk at different radii from the center of the annular disk. The annular disk, the dual drive gear hub, and the sense plate are formed together as a single piece.

In one example, the dual drive gear further includes a pair of tabs projecting radially inward from the inner surface of the dual drive gear hub and configured to engage an annular slot on an outer surface of a support to retain the dual drive gear on the support.

In one example, the dual drive gear further includes a pair of end stops projecting from the first axial end face of the annular disk and configured to engage a second gear of the plurality of reduction gears to limit rotational travel of the dual drive gear.

In one example, each of the end stops extends from one of the curved walls of the dual drive gear hub to the outer periphery of the annular disk and has a curved side surface configured to contact multiple teeth on the second gear at the same time.

In one example, the dual drive gear further includes a pair of spring actuators and a pair of travel stops projecting from the second axial end face of the annular disk. Each of the spring actuators includes a curved wall that is parallel to and spaced radially inward from one of the curved wall sections of the sense plate. Each of the travel stops includes a flat wall that extends radially inward from one of the curved wall sections of the sense plate and abuts one of the spring actuators.

In one example, the plurality of teeth are disposed along a portion of the outer periphery and are located at a first radius from the center of the annular disk, and one of the curved wall sections of the sense plate spans the portion of the outer periphery and has a second radius from the center of the annular disk that is greater than or equal to the first radius.

In one example, the entire dual drive gear is made from metal powder.

An example of an actuation assembly for a transfer case includes a support, a shift fork, a reduction hub, a shift collar, a dual drive gear, and a dual drive gear hub. The support includes a base configured to be fixed to a housing of the transfer case and a hollow cylindrical body projecting from the base in a first axial direction. The hollow cylindrical body defines a pair of axial slots that extend in the first axial direction. The shift fork includes an arc-shaped body and a pair of protrusions projecting radially outward in opposite directions from the arc-shaped body. The protrusions are configured to extend through the axial slots in the hollow cylindrical body of the support. The reduction hub includes a pair of flanges defining an annular groove configured to receive the arc-shaped body of the shift fork, internal splines configured to engage a first output shaft, and external splines configured to engage one of an input shaft and a carrier gear coupled to the input shaft through a planetary gear. The shift collar includes an annular body having an inner surface and an outer surface. The inner surface defines a pair of internal threads configured to receive distal ends of the protrusions on the shift fork. The dual drive gear includes an annular disk having a plurality of teeth disposed along an outer periphery thereof and configured to engage a reduction gear driven by a shift motor. The dual drive gear hub includes an annular wall, a pair of curved walls, and a pair of tabs. The annular wall is attached to an inner periphery of the annular disk. The curved walls project from the annular wall in the first axial direction and are configured to actuate a mode clutch actuator of the transfer case to engage or disengage a second output shaft. The tabs project radially inward from the annular wall and are configured to engage an annular slot on an outer surface of the hollow cylindrical body of the support to retain the dual drive gear on the support.

In one example, the actuation assembly further includes a sense plate projecting from the annular disk in a second axial direction opposite of the first axial direction and extending around the outer periphery of the annular disk.

In one example, the dual drive gear further includes a pair of spring actuators and a pair of travel stops projecting from the annular disk in the second axial direction. Each of the spring actuators includes a curved wall that is parallel to and spaced radially inward from the sense plate. Each of the travel stops includes a flat wall that extends radially inward from the sense plate and abuts one of the spring actuators.

In one example, the dual drive gear, the dual drive gear hub, and the sense plate are formed together as a single piece.

In one example, the actuation assembly further includes a compression spring configured to transfer torque from the dual drive gear to the shift collar.

In one example, the shift collar includes a bracket configured to retain the compression spring around the outer surface of the annular body of the shift collar. The bracket includes a pair of forks spaced apart from one another around the outer surface of the shift collar. Each of the forks defines an open-ended slot configured to receive one of the spring actuators on the dual drive gear.

In one example, the travel stops on the shift collar are configured to engage the forks on the shift collar to limit rotation of the dual drive gear relative to the shift collar.

Another example of an actuation assembly for a transfer case includes a support, a shift fork, a reduction hub, a shift collar, a dual drive gear, and a dual drive gear hub. The support includes a base configured to be fixed to a housing of the transfer case and a hollow cylindrical body projecting from the base in a first axial direction. The hollow cylindrical body defines a pair of axial slots that extend in the first axial direction. The shift fork includes an arc-shaped body and a pair of protrusions projecting radially outward in opposite directions from the arc-shaped body. The protrusions are configured to extend through the axial slots in the hollow cylindrical body of the support. The arc-shaped body and the protrusions are formed together as a single piece. The reduction hub includes a pair of flanges defining an annular groove configured to receive the arc-shaped body of the shift fork, internal splines configured to engage a first output shaft, and external splines configured to engage one of an input shaft and a carrier gear coupled to the input shaft through a planetary gear. The shift collar including an annular body having an inner surface and an outer surface. The inner surface defines a pair of internal threads configured to receive distal ends of the protrusions on the shift fork. The dual drive gear includes an annular disk having a plurality of teeth disposed along an outer periphery thereof and configured to engage a reduction gear driven by a shift motor. The dual drive gear hub includes an annular wall disposed around an inner periphery of the annular disk and a pair of curved walls projecting from the annular wall in the first axial direction and configured to actuate a mode clutch actuator of the transfer case to engage or disengage a second output shaft.

In one example, each of the distal ends of the protrusions on the shift fork have a pair of opposing chamfered edges configured to engages a pair of opposing ramped surfaces of one of the internal threads on the shift collar.

In one example, the entire shift fork is made from aluminum using a single die casting operation.

In one example, the actuation assembly further includes a sense plate projecting from the annular disk in a second axial direction opposite of the first axial direction and extending around the outer periphery of the annular disk.

In one example, the dual drive gear further includes a pair of spring actuators and a pair of travel stops projecting from the annular disk in the second axial direction. Each of the spring actuators includes a curved wall that is parallel to and spaced radially inward from the sense plate. Each of the travel stops includes a flat wall that extends radially inward from the sense plate and abuts one of the spring actuators.

In one example, the dual drive gear, the dual drive gear hub, and the sense plate are formed together as a single piece.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1B is an enlarged section view of a portion of the EMOD transfer case of

FIG. 1A within an area labelled 1B;

In the drawings, reference numbers may be reused to identify similar and/or identical elements.

DETAILED DESCRIPTION

Figure 1A:
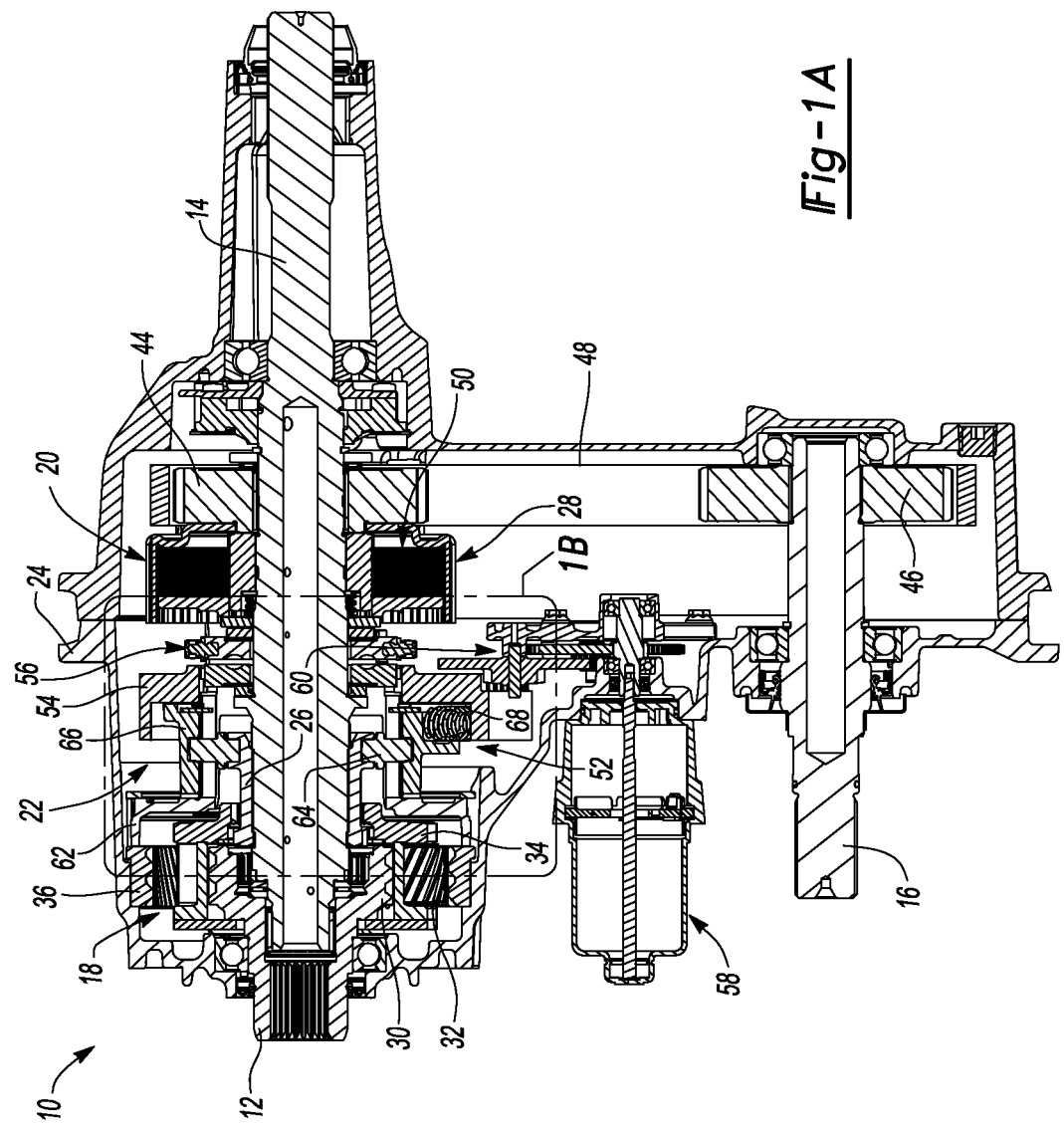
FIG. 1A is a section view of an example of a EMOD transfer case according the principles of the present disclosure.

A dual drive gear assembly typically includes a dual drive gear, a dual drive gear hub, a snap ring, and a sense plate. The dual drive gear is an annular disk including teeth on its outer periphery for engaging a reduction gear that couples the dual drive gear to the shift motor. The snap ring retains the dual drive gear hub within a bore in the dual drive gear, and the dual drive gear hub includes a pair of curved walls that project from a first axial end face of the dual drive gear and engage the clutch actuator to apply or release the mode clutch. The sense plate includes a plurality of curved wall sections that project from a second axial end face of the dual drive gear opposite of the first axial end face. The curved wall sections are disposed at different radii from the center of the bore to enable a position sensor to measure the position of the dual drive gear and thereby determine the mode and range of the transfer case.

A range shift mechanism typically includes a support, a shift fork assembly, a shift collar, and a torsional spring. The support is fixed to a housing of the transfer case and supports the other components of the range shift mechanism, as well as the dual drive gear. The shift fork assembly includes an arc-shaped body and a pair of rollers that project radially outward from the arc-shaped body. The arc-shaped body defines an annular groove that receives the reduction hub so that the reduction hub translates with the shift fork assembly while rotating freely relative to the shift fork assembly. The rollers extend through axial slots in the support and into a spiral groove in the inner surface of the shift collar so that rotation of the shift collar causes translation of the shift fork assembly. The torsional spring transfers torque from the dual drive gear assembly to the shift collar while preventing undesirable gear tooth clash or shift blocking.

As indicated above, a dual drive gear assembly typically includes four pieces. In addition, a shift fork assembly typically includes ten pieces. However, an EMOD transfer case according the present disclosure includes several features that enable consolidating each of these assemblies into a single piece, which reduces cost. In one example, the teeth on the dual drive gear span a portion of its outer periphery, and the radius of the sense plate along that portion is greater than or equal to the radius of the teeth to enable forming the dual drive gear and the sense plate together as a single piece. In another example, the rollers projecting radially outward from the arc-shaped body of the shift fork assembly are replaced with projections having chamfered edges, which enable the projections to travel along the spiral groove of the shift collar without rolling. Thus, the chamfered edges on the projections enable forming the arc-shaped body and the rollers together as a single piece.

An EMDO transfer case according to the present disclosure includes additional features that eliminate components and reduce cost. In one example, a dual drive gear according to the present disclosure includes a pair of tabs projecting radially inward that engage an annular slot on the outer surface of the support to retain dual drive gear on the support. Thus, the tabs enable eliminating a retaining ring and fasteners that are typically used to retain the dual drive gear on the support. In another example, the dual drive gear and the shift collar include spring retaining and engagement features that enable transferring torque from the dual drive gear to the shift collar using a compression spring instead of a torsion spring. Since a compression spring typically costs less than a torsion spring, these design features also reduce cost.

Figure 1B:
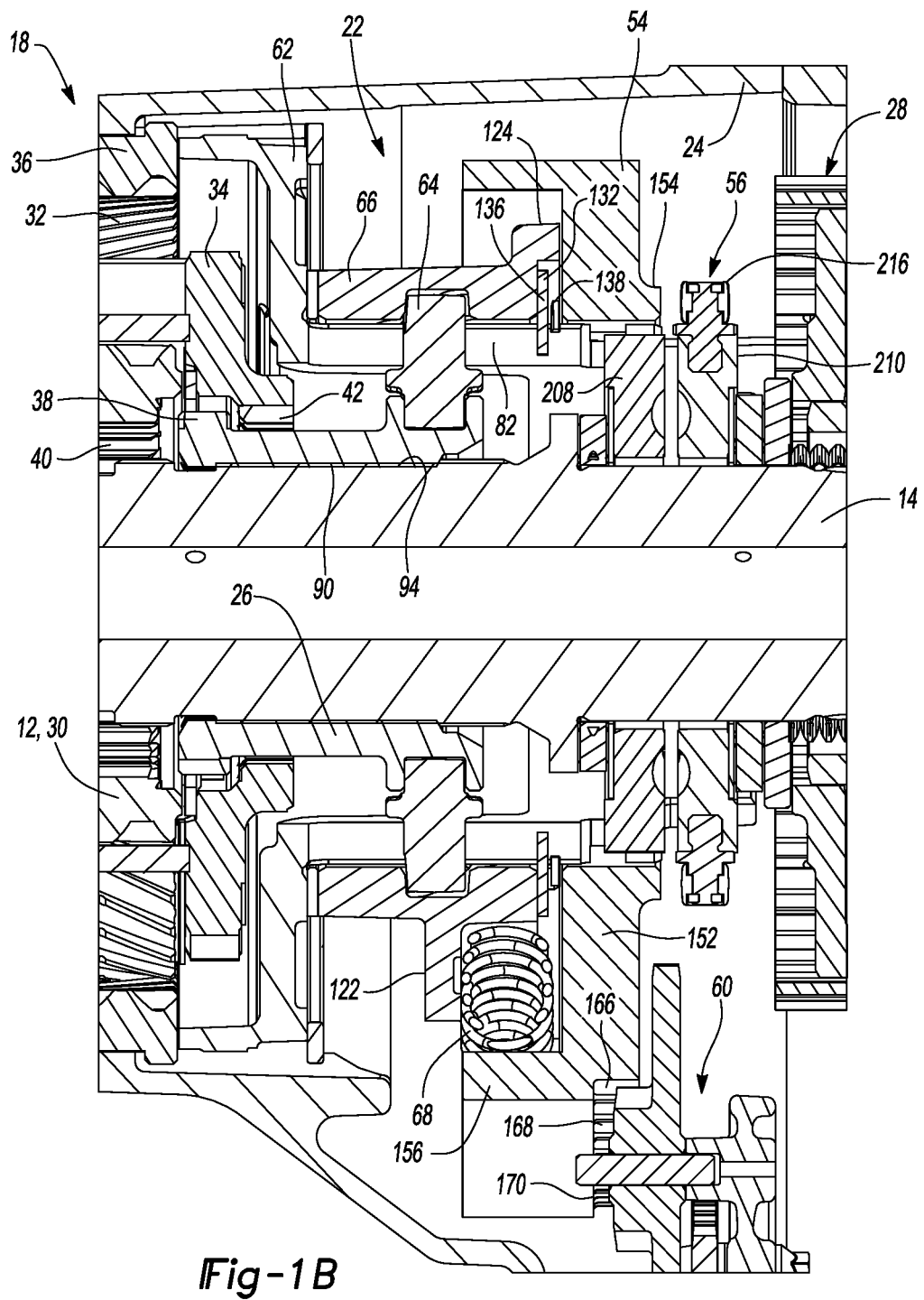

Referring now to FIGS. 1A and 1B, an EMOD transfer case 10 includes an input shaft 12, a first output shaft 14, a second output shaft 16, a planetary gear set 18, a coupling mechanism 20, an actuation assembly 22, and a transfer case housing 24. The planetary gear set 18 transfer torque from the input shaft 12 to the first output shaft 14. The coupling mechanism 20 couples the second output shaft 16 to the first output shaft 14. The actuation assembly 22 actuates a reduction hub 26 that is splined to the first output shaft 14 to adjust a gear ratio at which torque is transferred from the input shaft 12 to the first output shaft 14. Adjusting this gear ratio is referred to as shifting a range of the EMOD transfer case 10, and the range of the EMOD transfer case 10 may be shifted between low, high, and neutral. The reduction hub 26 may be considered part of the actuation assembly 22.

In addition to adjusting the range, the actuation assembly 22 actuates a mode clutch 28 of the coupling mechanism 20 to couple the second output shaft 16 to the first output shaft 14 and decouple the second output shaft 16 from the first output shaft 14. Coupling and decoupling the second output shaft 16 is referred to as shifting a mode of the EMOD transfer case 10. The mode of the EMOD transfer case 10 may be shifted between a two-wheel drive (2 WD) mode, in which the second output shaft 16 is decoupled from the first output shaft 14, and a four-wheel drive (4 WD) mode, in which the second output shaft 16 is coupled the first output shaft 14.

The planetary gear set 18 includes a sun gear 30, a plurality of planetary gears 32, a carrier gear 34, and a ring gear 36. The sun gear 30 is part of, or formed integrally with, the input shaft 12. The ring gear 36 is fixed to the transfer case housing 24 to prevent rotation and axial translation of the ring gear 36. The planetary gears 32 are disposed between the sun gear 30 and the ring gear 36 in a radial direction R. The carrier gear 34 carries the planetary gears 32 using, for example, spindles that extend through the centers of the planetary gears 32 and connect the planetary gears 32 to the carrier gear 34 while allowing the planetary gears 32 to rotate relative to the carrier gear 34. Rotation of the sun gear 30 causes the planetary gears 32 to rotates within the ring gear 36 and around the sun gear 30, which rotates the carrier gear 34 at a reduced speed relative to the sun gear 30.

The actuation assembly 22 adjusts the range of the EMOD transfer case 10 to low by moving the reduction hub 26 axially (i.e., along a longitudinal axis L) to a first position in which the reduction hub 26 couples the first output shaft 14 directly to the input shaft 12. In the first positon, external splines 38 on the reduction hub 26 engage internal splines 40 on the input shaft 12. The actuation assembly 22 adjusts the range of the EMOD transfer case 10 to high by moving the reduction hub 26 axially to a second position in which the reduction hub 26 couples the first output shaft 14 to the input shaft 12 through the planetary gear set 18. In the second position, the external splines 38 on the reduction hub 26 engage internal splines 42 on the carrier gear 34.

The actuation assembly 22 adjusts the range of the EMOD transfer case 10 to neutral by moving the reduction hub 26 axially to a third position between the first and second position to decouple the first output shaft 14 from the input shaft 12. In the third position, the external splines 38 on the reduction hub 26 do not engage the internal splines 40 on the input shaft 12 or the internal splines 42 on the carrier gear 34. Thus, the input shaft 12 is allowed to rotate freely within the EMOD transfer case 10.

The coupling mechanism 20 includes the mode clutch 28, a drive gear 44, a driven gear 46, and a belt or chain 48 that couples the driven gear 46 to the drive gear 44. The drive gear 44 is coaxially with the first output shaft 14 and is mounted to the first output shaft 14 in a manner that allows the drive gear 44 to rotate relative to the first output shaft 14 when the mode clutch 28 is disengaged. For example, the drive gear 44 may be mounted to the first output shaft 14 using a bearing. The driven gear 46 is coaxial with the second output shaft 16 and is mounted to the second output shaft 16 such that the second output shaft 16 rotates with the driven gear 46. For example, the driven gear 46 may be mounted to the second output shaft 16 using splines. The mode clutch 28 includes a clutch pack 50 that connects the drive gear 44 to the first output shaft 14, and thereby couples the second output shaft 16 to the first output shaft 14, when pressure is applied to the clutch pack 50.

With additional reference to FIGS. 2-5, the actuation assembly 22 includes a range shift mechanism 52, a dual drive gear 54, a mode clutch actuator 56, an electronic shift motor 58, and a reduction gear set 60. The range shift mechanism 52 includes a support 62, the reduction hub 26, a shift fork 64, a shift collar 66, and a compression spring 68. The support 62 positions the other components of the range shift mechanism 52, and the dual drive gear 54, within the transfer case housing 24 while allowing the other components and the dual drive gear 54 to rotate and/or translate relative the transfer case housing 24.

The support 62 includes a base 70 and a hollow cylindrical body 72 projecting from the base 70 in a first axial direction Al. The entire support 62 can be integrally formed (e.g., die casted) from metal (e.g., aluminum B383) as a single piece. The base 70 is fixed to the transfer case housing 24 (FIG. 1B) to prevent the support 62 from rotating or translating relative to the transfer case housing 24. The base 70 has an annular disk shape with a first axial end surface 74 and a second axial end surface 76 opposite of the first axial end surface 74.

The hollow cylindrical body 72 projects from the second axial end surface 76 of the base 70 and has an inner surface 78 and an outer surface 80 opposite of the inner surface 78. The hollow cylindrical body 72 defines a pair of axial slots 82 that extend in the first axial direction Al and through the inner and outer surfaces 78 and 80 thereof. In addition, the outer surface 80 of the hollow cylindrical body 72 defines an annular slot 84 that extends around the outer periphery of the hollow cylindrical body 72.

The reduction hub 26 includes a tubular body 86, the external splines 38 and a pair of flanges 88 projecting radially outward from the tubular body 86, and internal splines 90 projecting radially inward from the tubular body 86. The flanges 88 define an annular groove 92 therebetween. The internal splines 90 on the reduction hub 26 engage external splines 94 (FIG. 1B) on the first output shaft 14 such that the first output shaft 14 rotates with the reduction hub 26. As discussed above, depending on the axial position of the reduction hub 26, the external splines 38 on the reduction hub 26 can engage either the internal splines 40 on the input shaft 12 or the internal splines 42 on the carrier gear 34.

Figure 2:
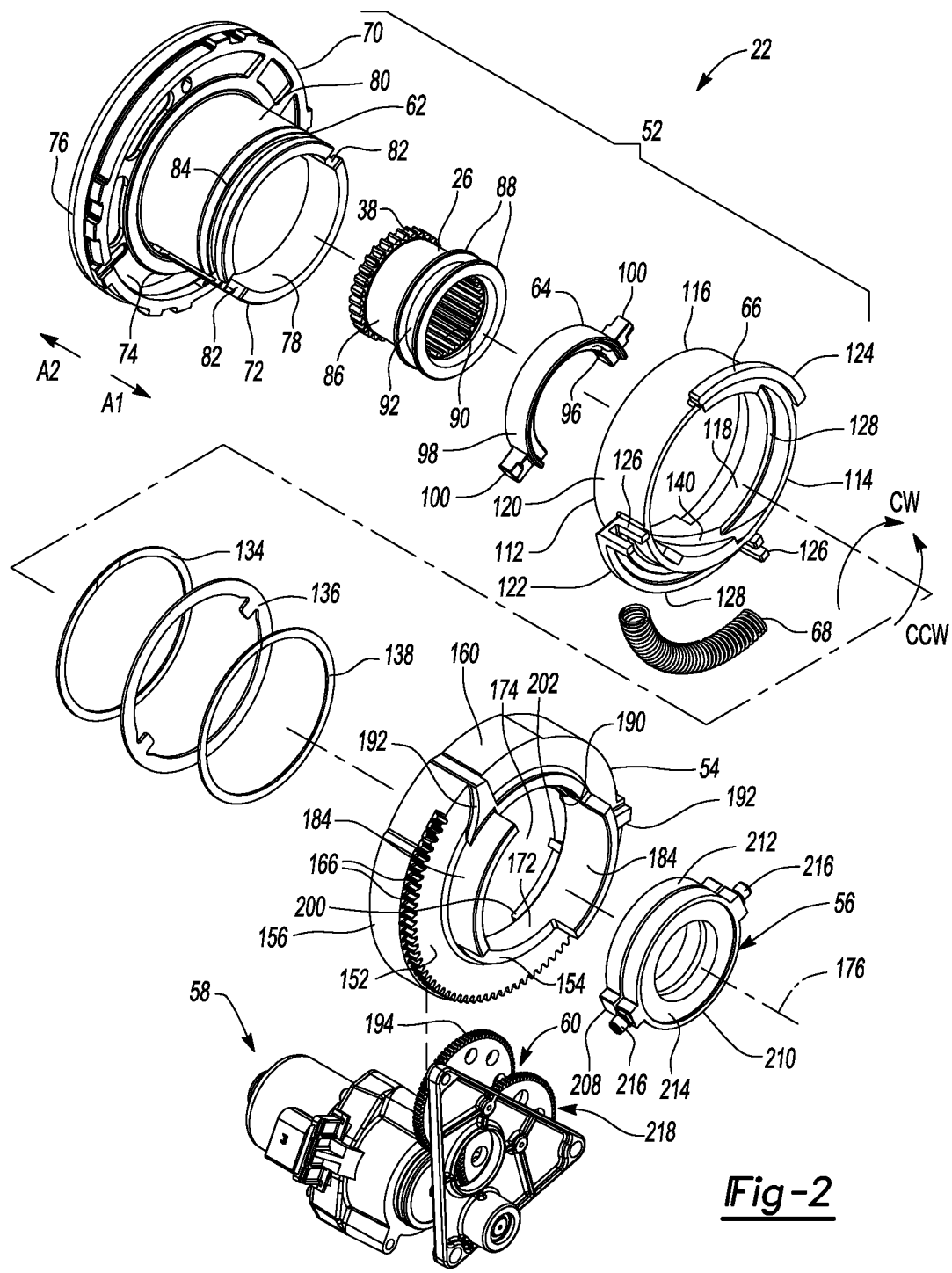
FIG. 2 is an exploded perspective view of including an example of an actuation assembly for an EMOD transfer case, the actuation assembly including a range shift mechanism, a mode clutch actuator, a dual drive gear.
Figure 3:
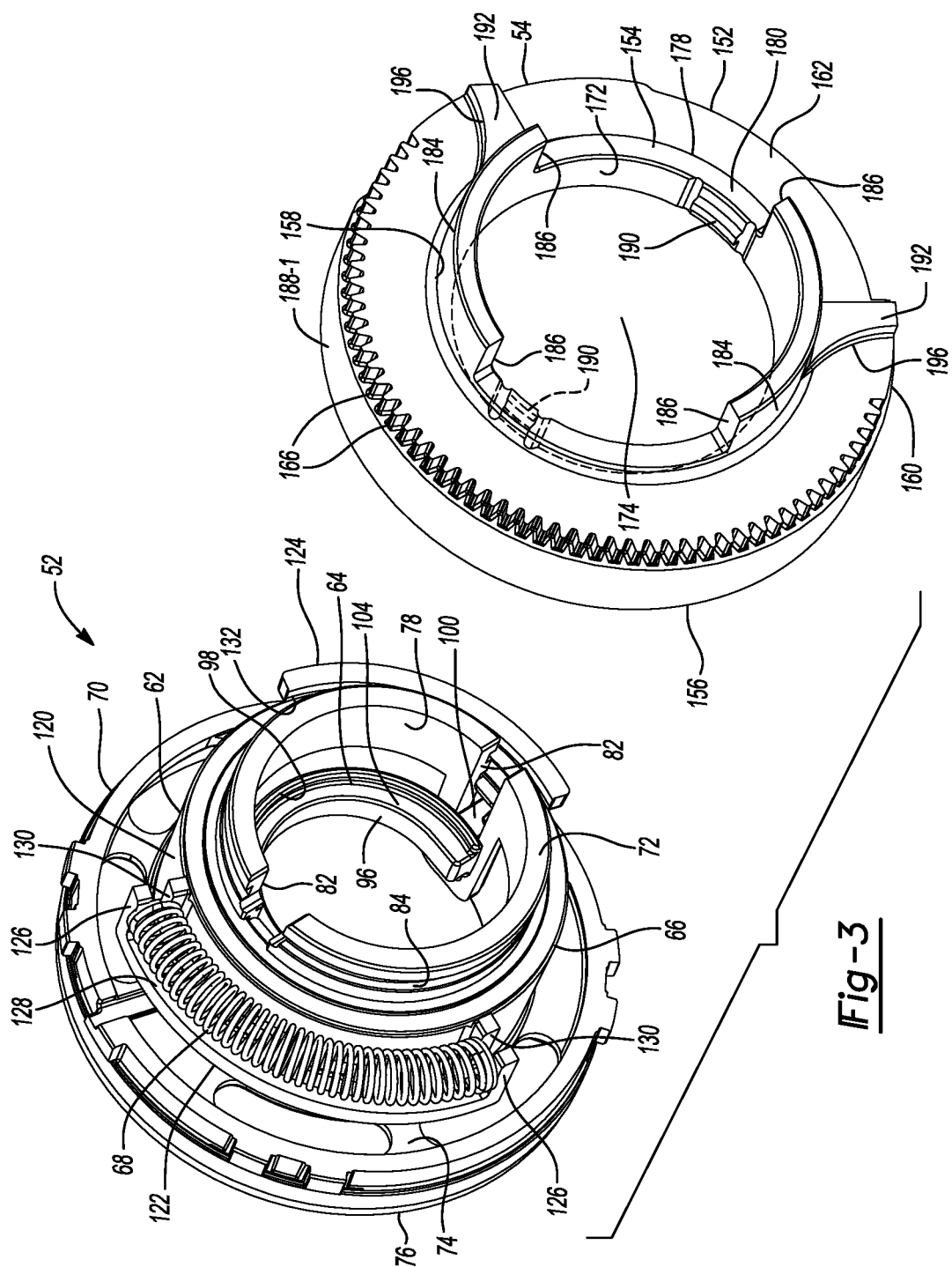
FIGS. 3 and 4 are perspective views of the dual drive gear of FIG. 2 disassembled from the range shift mechanism of FIG. 2.
Figure 4:
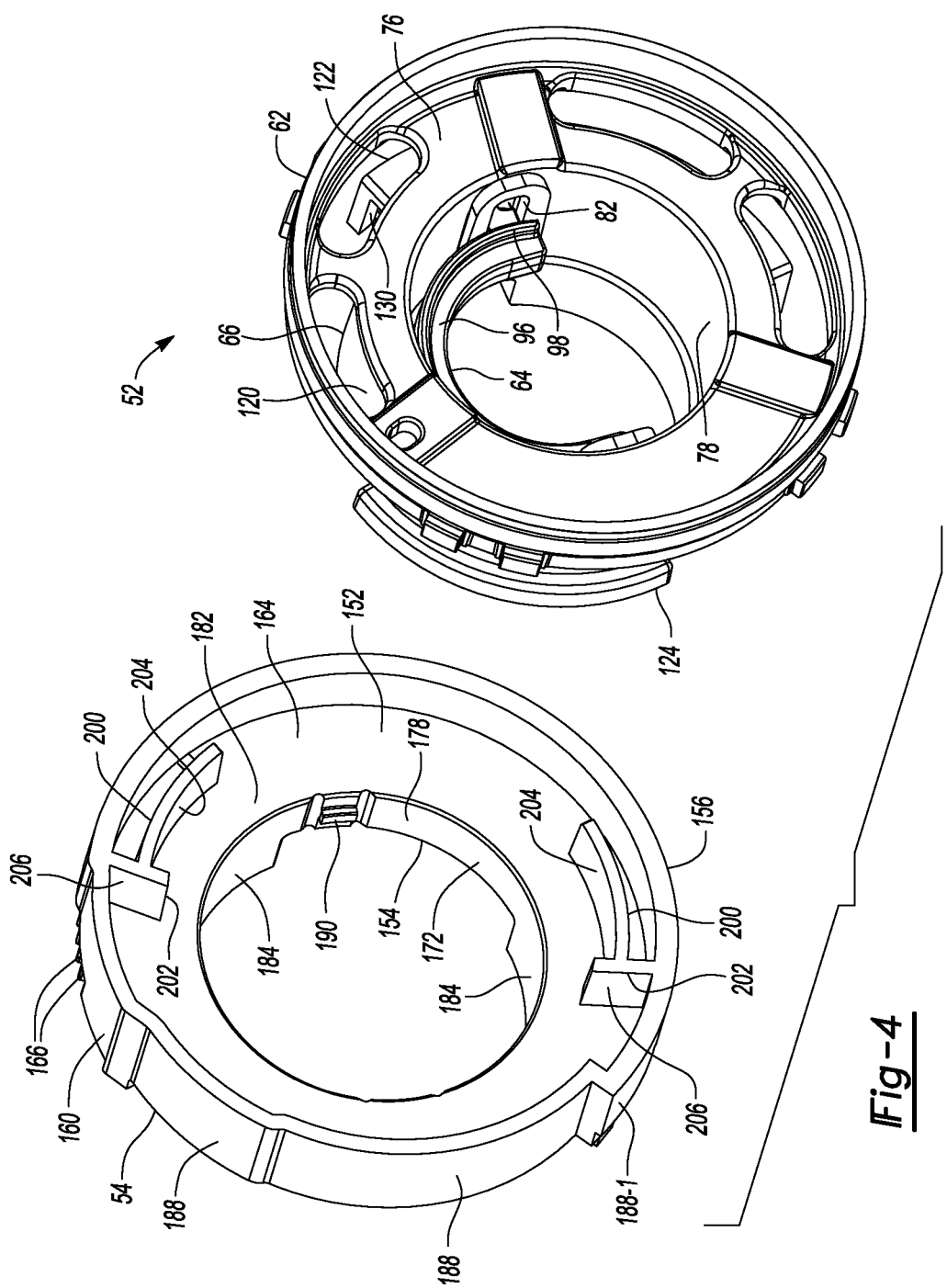
Figure 5:
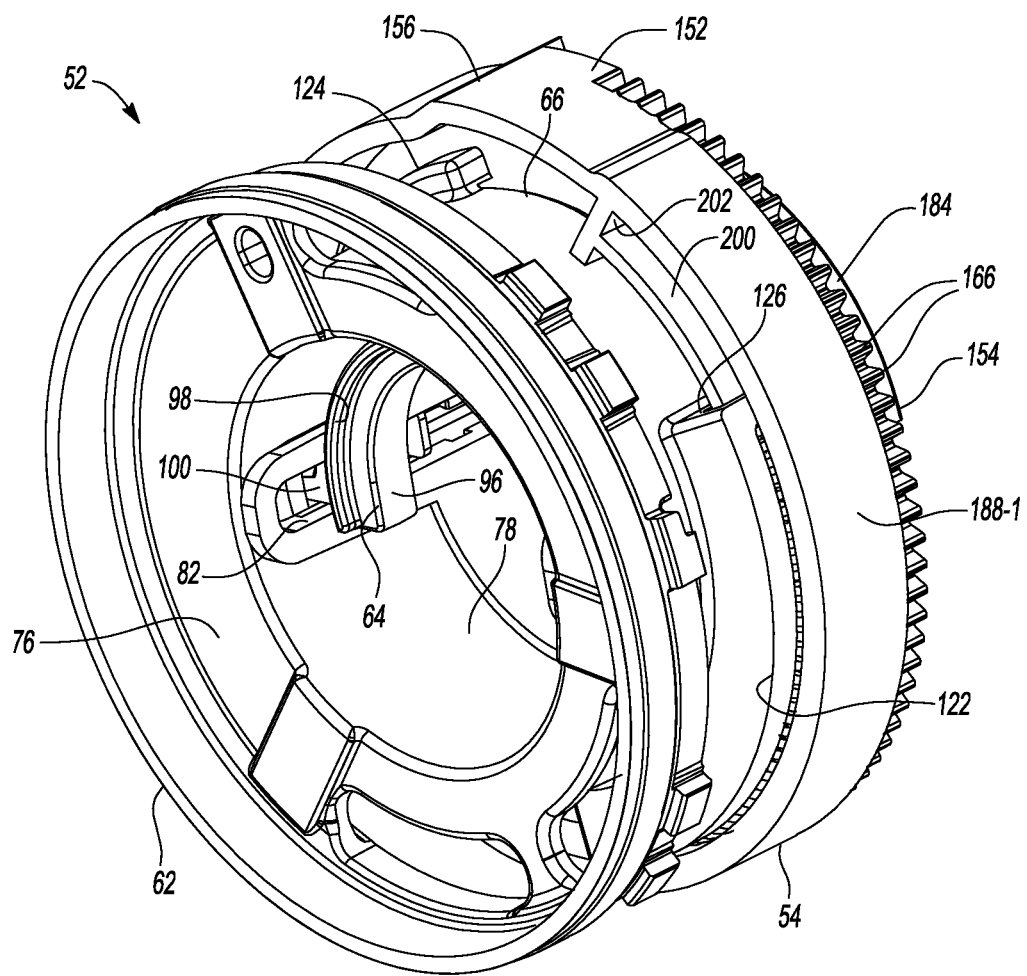
FIG. 5 is a perspective view of the dual drive gear of FIG. 2 assembled to the range shift mechanism of FIG. 2.

Referring now to FIGS. 2-5, 8, 9, and 12-14, the shift fork 64 includes an arc-shaped body 96, a curved wall 98 extending around the outer periphery of the arc-shaped body 96, and a pair of protrusions 100 projecting radially outward in opposite directions from the curved wall 98. The entire shift fork 64 can be integrally formed (e.g., die casted) from metal (e.g., high silicon aluminum B390) as a single piece. The annular groove 92 in the reduction hub 26 receives the arc-shaped body 96 of the shift fork 64 such that the reduction hub 26 moves axially with the shift fork 64. When the range shift mechanism 52 is assembled as shown in FIGS. 3-5, the protrusions 100 on the shift fork 64 extend through the axial slots 82 in the hollow cylindrical body 72 of the support 62.

Figure 12:
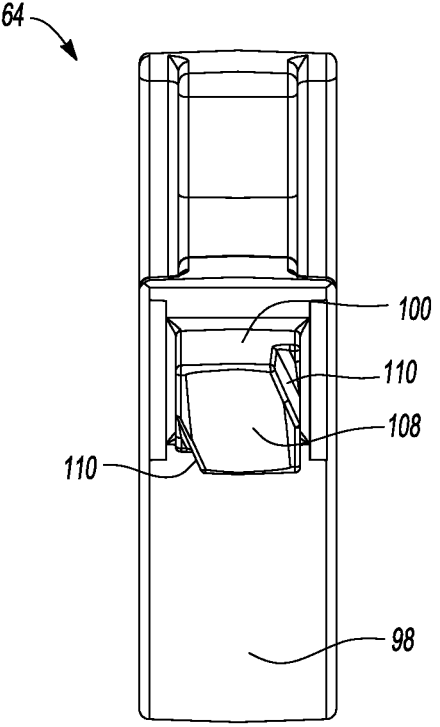
FIGS. 12, 13, and 14 are perspective views of the shift fork in the actuation assembly of FIG. 2 illustrating the protrusions on the shift fork.
Figure 13:
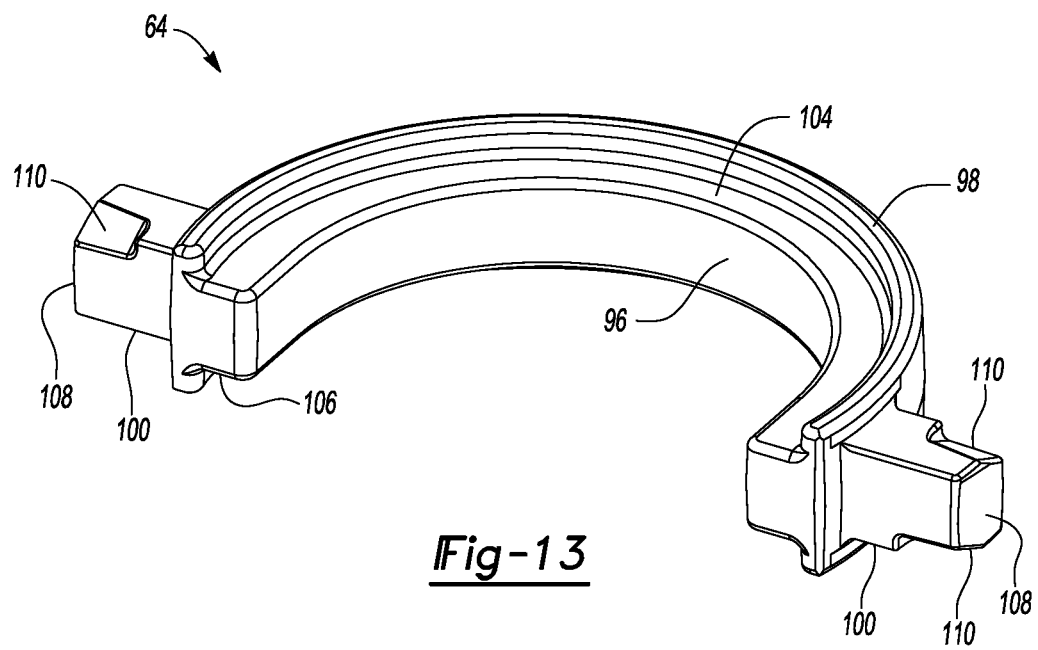
Figure 14:
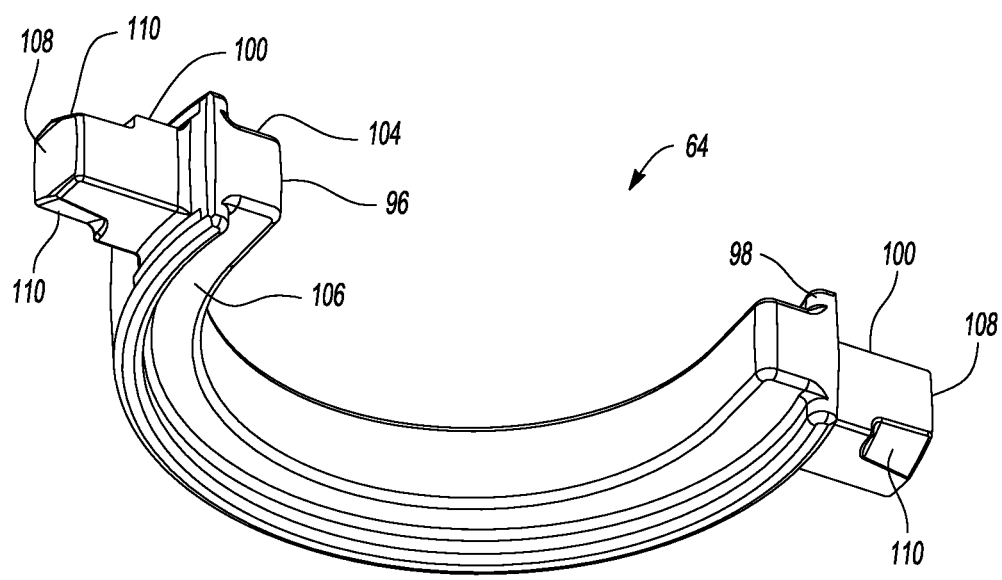

As best shown in FIGS. 12-14, the arc-shaped body 96 has a first axial end face 104 and a second axial end face 106 opposite of the first axial end face 104. The curved wall 98 extends axially between the first and second axial end faces 104 and 106 and beyond the first and second axial end faces 104 and 106. Each of the protrusions 100 has a distal end 108 with a pair of opposing chamfered edges 110.

Referring now to FIGS. 2 and 8-11, the shift collar 66 includes an annular body 112 having a first end 114, a second end 116, an inner surface 118, an outer surface 120, a spring retaining bracket 122, and a ring retaining flange 124. The entire shift collar 66 can be integrally formed (e.g., die casted) from metal (e.g., high silicon aluminum B390) as a single piece. The spring retaining bracket 122 and the ring retaining flange 124 project from the outer surface 120 of the annular body 112 and are disposed adjacent to the first end 114 of the shift collar 66.

The spring retaining bracket 122 retains the compression spring 68 around the outer surface 120 of the annular body 112. The spring retaining bracket 122 includes a pair of forks 126 spaced apart from one another around the outer surface 120 of the annular body 112, and a spring seat 128 that extends between the forks 126. Each of the forks 126 defines a U-shaped or open-ended slot 130.

The compression spring 68 is captured between before the forks 126 and is supported by the spring seat 128. The compression spring 68 may be a helical or coil spring as shown. The length of the compression spring 68 in its relaxed state may be greater than the distance between the forks 126 on the spring retaining bracket 122 of the shift collar 66 such that the compression spring 68 remains compressed and captured between the forks 126.

The ring retaining flange 124 defines a channel 132 that retains a first thrust washer 134, a second thrust washer 136, and a snap ring 138. The first and second thrust washers 134 and 136 and the snap ring 138 are captured axially between the shift collar 66 and the dual drive gear 54. In addition, the first and second thrust washers 134 and 136 and the snap ring 138 are seated in the channel 132 of the ring retaining flange 124.

The inner surface 118 of the shift collar 66 defines a pair of opposing internal threads 140 that receive the distal ends 108 of the protrusions 100 on the shift fork 64. Each of the threads 140 has a pair of opposing ramped surfaces 142 that engage the chamfered edges 110 of the protrusions 100 on the shift fork 64. The angle of the ramped surfaces 142 on the threads 140 may be approximately equal to the angle of the chamfered edges 110 on the protrusions 100 of the shift fork 64.

The inner surface 118 of the shift collar 66 also defines a pair of opposing first ledges 144 and a pair of first end stops 146 adjacent to the first end 114 of the shift collar 66, and a pair of opposing second ledges 148 and a pair of second end stops 150 adjacent to the second end 116 of the shift collar 66. The first ledges 144 on the shift collar 66 engage the distal ends 108 of the protrusions 100 on the shift fork 64 when the protrusions 100 are adjacent to the first end 114 of the shift collar 66 and outside of the threads 140. The second ledges 148 on the shift collar 66 engage the distal ends 108 of the protrusions 100 on the shift fork 64 when the protrusions 100 are adjacent to the second end 116 of the shift collar 66 and outside of the threads 140. The first and second end stops 146 and 150 of the shift collar 66 engage the distal ends 108 of the protrusions 100 on the shift fork 64 to limit rotation travel of the shift collar 66.

Referring now to FIGS. 1B, 2-5, 8, and 9, rotation of the shift collar 66 within a certain angular range causes translation of the shift fork 64 and the reduction hub 26 in the first axial direction A1 or a second axial direction A2 opposite of the first axial direction A1. As discussed above, translating the reduction hub 26 in the first or second axial direction A1 or A2 shifts the range of the EMOD transfer case 10 between, for example, low, high, and neutral. The reduction hub 26 translates in the first or second axial direction A1 or A2 when the shift collar 66 rotates and the protrusions 100 on the shift fork 64 are disposed in the internal threads 140 on the shift collar 66.

When the shift collar 66 rotates and the protrusions 100 on the shift fork 64 are disposed in the internal threads 140 on the shift collar 66, the ramped surfaces 142 on the internal threads 140 engage the chamfered edges 110 on the protrusions 100 of the shift fork 64. This engagement yields a force acting on the shift fork 64 in one of the first or second axial directions A1 or A2, depending on the rotational direction of the shift collar 66. In addition, since the protrusions 100 on the shift fork 64 extend through the axial slots 82 in the support 62, the axial slots 82 constrain movement of the shift fork 64 to one of the first or second axial directions A1 or A2.

Figure 17:
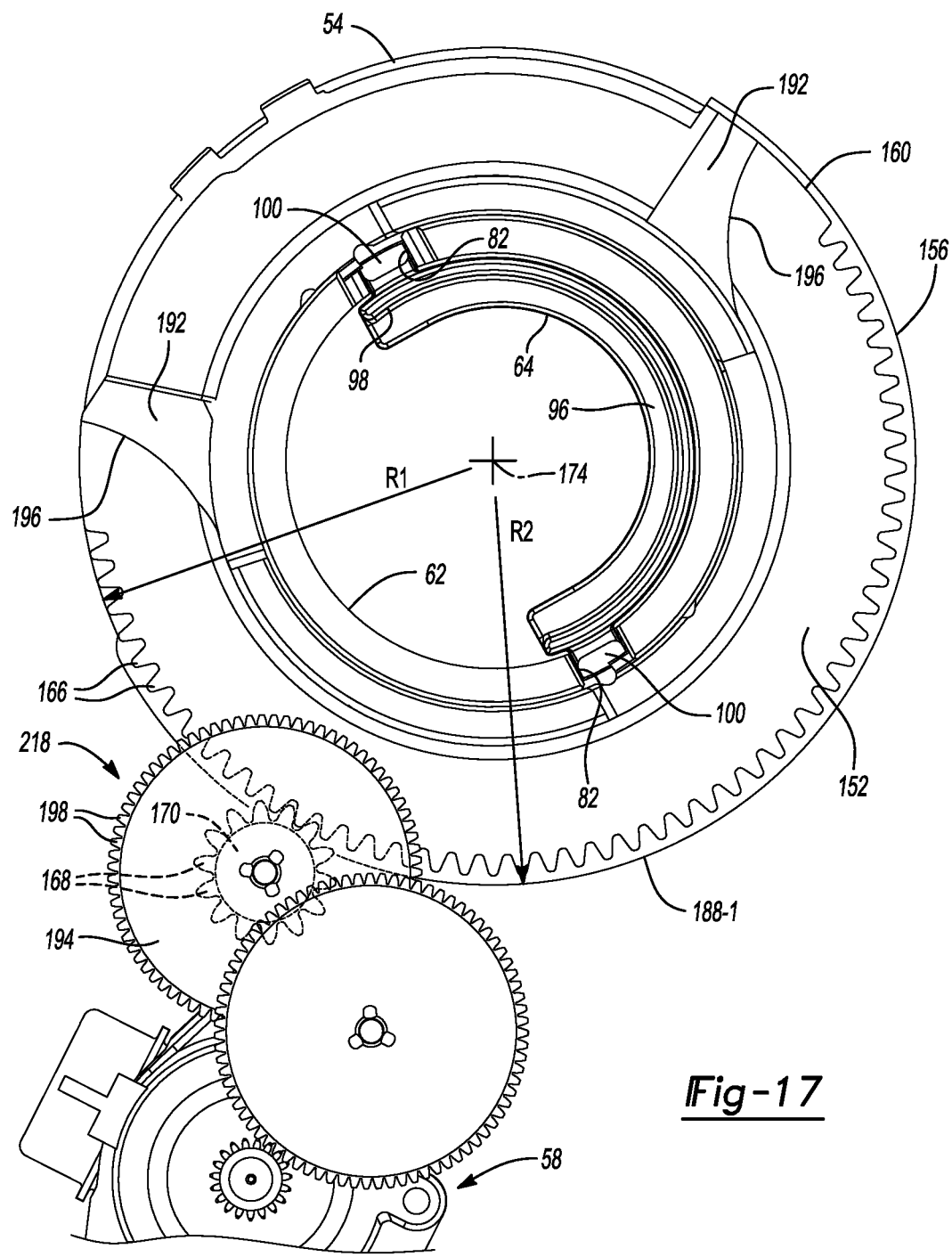
FIGS. 17 and 18 are section views of the actuation assembly of FIG. 2 with the mode clutch actuator removed to illustrate engagement between a reduction gear in the actuation assembly with an end stop on the dual drive gear of the actuation assembly.
Figure 18:
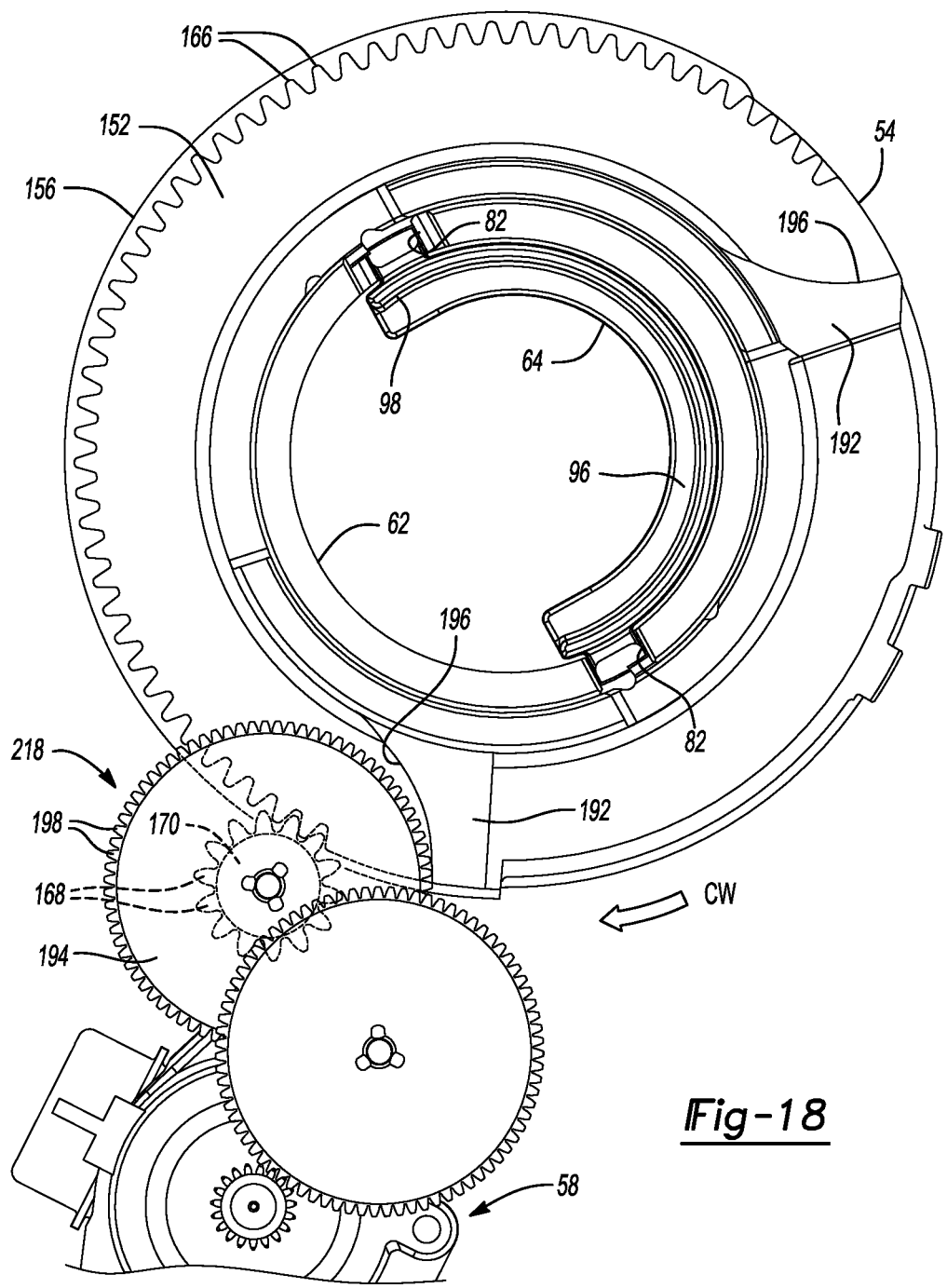

Referring now to FIGS. 2-5, 17, and 18, the dual drive gear 54 includes an annular disk 152, a dual drive gear hub 154, and a sense plate 156. The entire dual drive gear 54 can be integrally formed from metal powder as a single piece. The annular disk 152 has an inner periphery 158, an outer periphery 160, a first axial end face 162, and a second axial end face 164 opposite of the first axial end face 162. The outer periphery 160 of the annular disk 152 defines a plurality of teeth 166 that project radially outward. As shown in FIGS. 17 and 18, the teeth 166 on the annular disk 152 engage teeth 168 on a first reduction gear 170 of the reduction gear set 60.

The dual drive gear hub 154 projects radially inward from the inner periphery 158 of the annular disk 152 and projects axially beyond the first axial end face 162 of the annular disk 152 in the first axial direction Al. The dual drive gear hub 154 has an inner surface 172 that defines a bore 174. The bore 174 extends through a center 176 of the dual drive gear 54 and receives the hollow cylindrical body 72 of the support 62.

The dual drive gear hub 154 includes an annular body 178 having a first axial end face 180 and a second axial end face 182 opposite of the first axial end face 180, and a pair of curved walls 184 projecting from the first axial end face 180 in the first axial direction Al. The second axial end face 182 of the drive gear hub 154 and the second axial end face 164 of the annular disk 152 collectively form a single continuous surface. The curved walls 184 of the drive gear hub 154 are spaced apart from one another around the inner periphery 158 of the annular disk 152 and have edges 186.

The sense plate 156 projects from the second axial end face 164 of the annular disk 152 in the second axial direction A2. The sense plate 156 includes a plurality of curved wall sections 188 disposed about the outer periphery 160 of the annular disk 152 at different radii from the center 176 of the dual drive gear 54. The different radii of the curved wall sections 188 of the sense plate 156 enables using a position sensor, such as a Hall Effect sensor, to measure the rotational position of the dual drive gear 54 and thereby detect the range and mode of the EMOD transfer case 10.

The teeth 166 on the outer periphery 160 of the annular disk 152 span a portion of the outer periphery 160, and the curved wall sections 188 of the sense plate 156 include a first curved wall section 188-1 that spans that portion of the outer periphery 160. Referring briefly to FIGS. 17 and 18, the teeth 166 are located at a first radius R1 from the center 176 of the dual drive gear 54, and the first curved wall section 188-1 is located at a second radius R2 from the center 176 of the dual drive gear 54. The second radius R2 of the first curved wall section 188-1 is greater than or equal to the first radius R1 of the teeth 166, which enables integrally forming the annular disk 152 and the sense plate 156 (i.e., forming these components together as a single piece).

Figure 6:
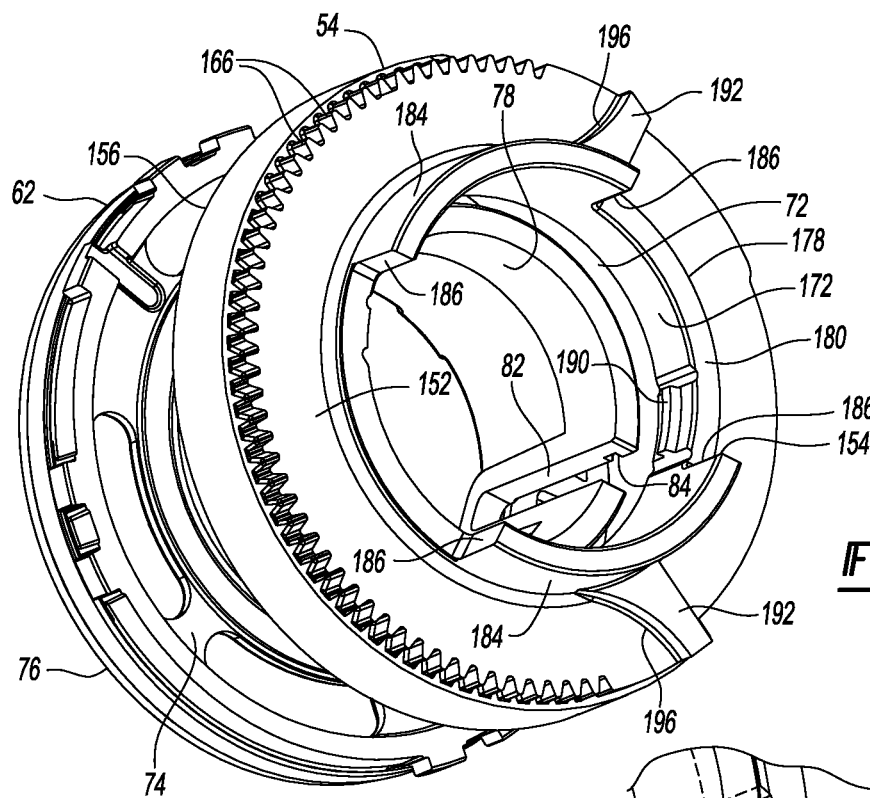
FIGS. 6 and 7 are perspective views of the dual drive gear of FIG. 2 and a support in the range shift mechanism of FIG. 2, or portions thereof, illustrating insertion of internal tabs on the dual drive gear into an annular slot on the support.
Figure 7:
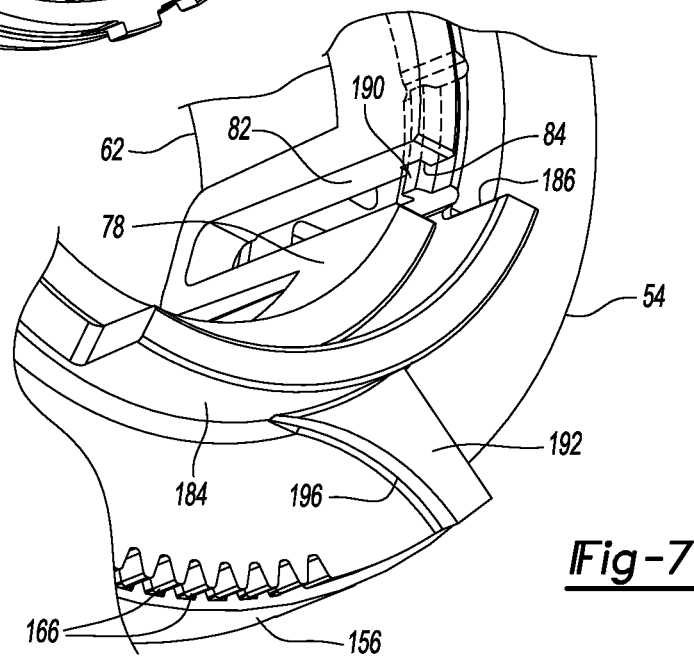
Figure 8:
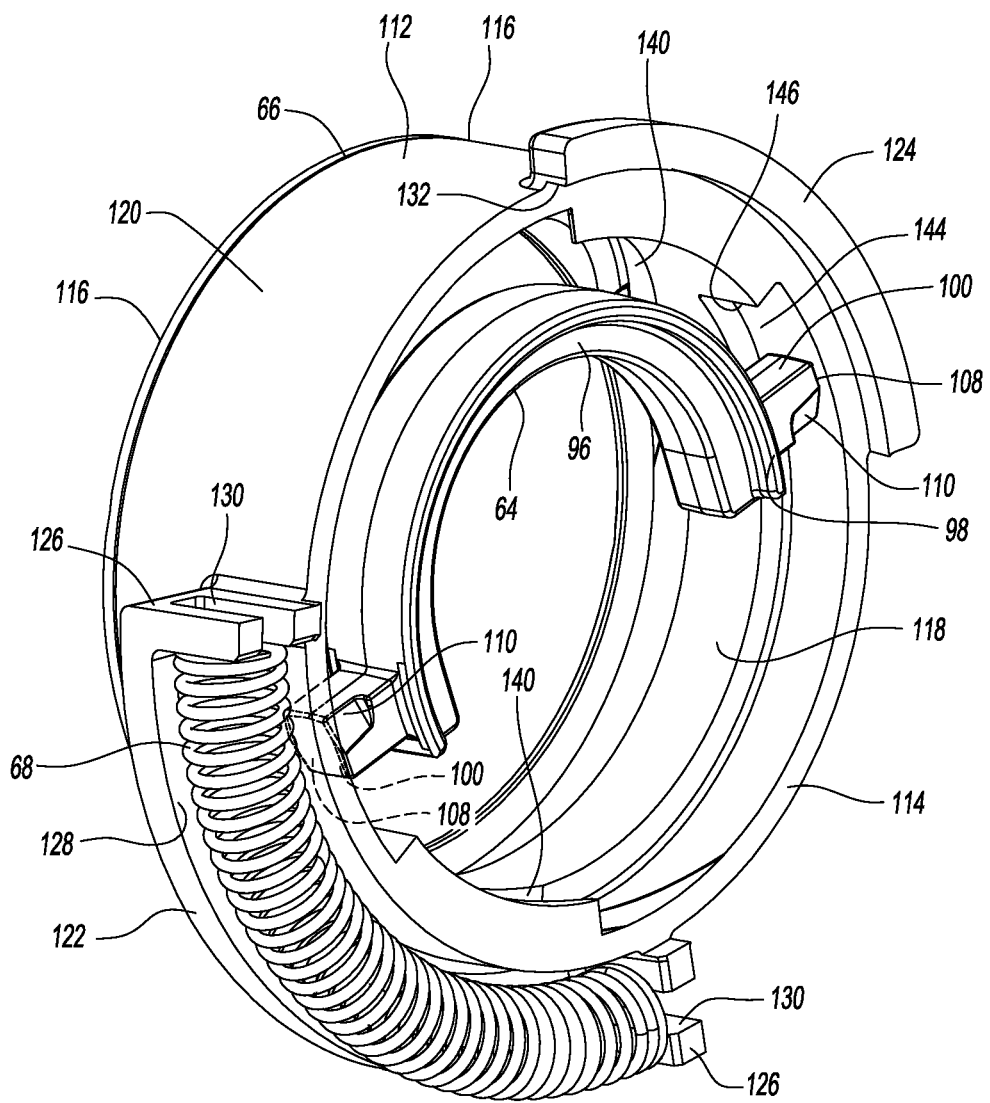
FIGS. 8 and 9 are perspective views of the range shift mechanism of FIG. 2 with the support of the range shift mechanism removed to illustrate engagement between protrusions on the shift fork of the range shift mechanism and internal threads on a shift collar of the range shift mechanism.
Figure 9:
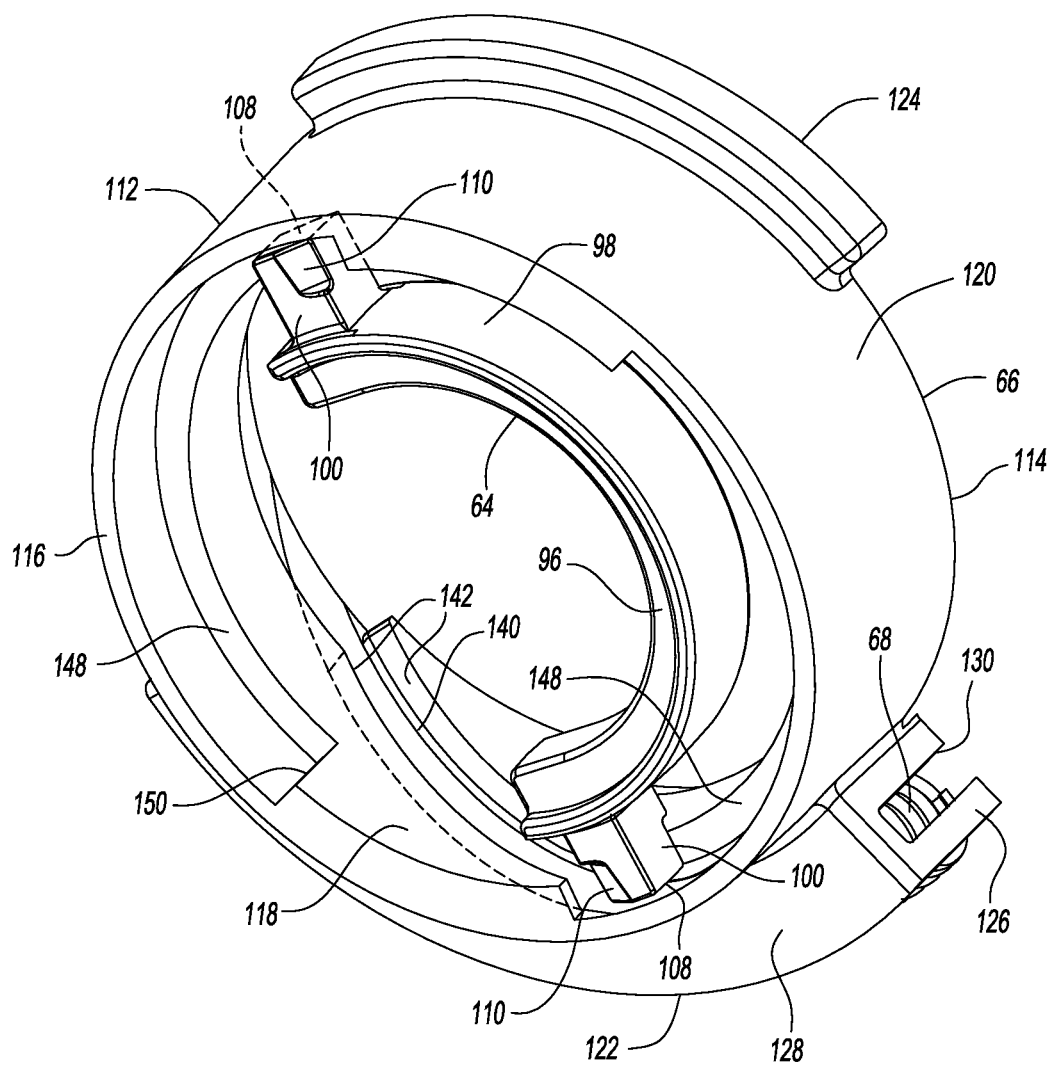
Figure 10:
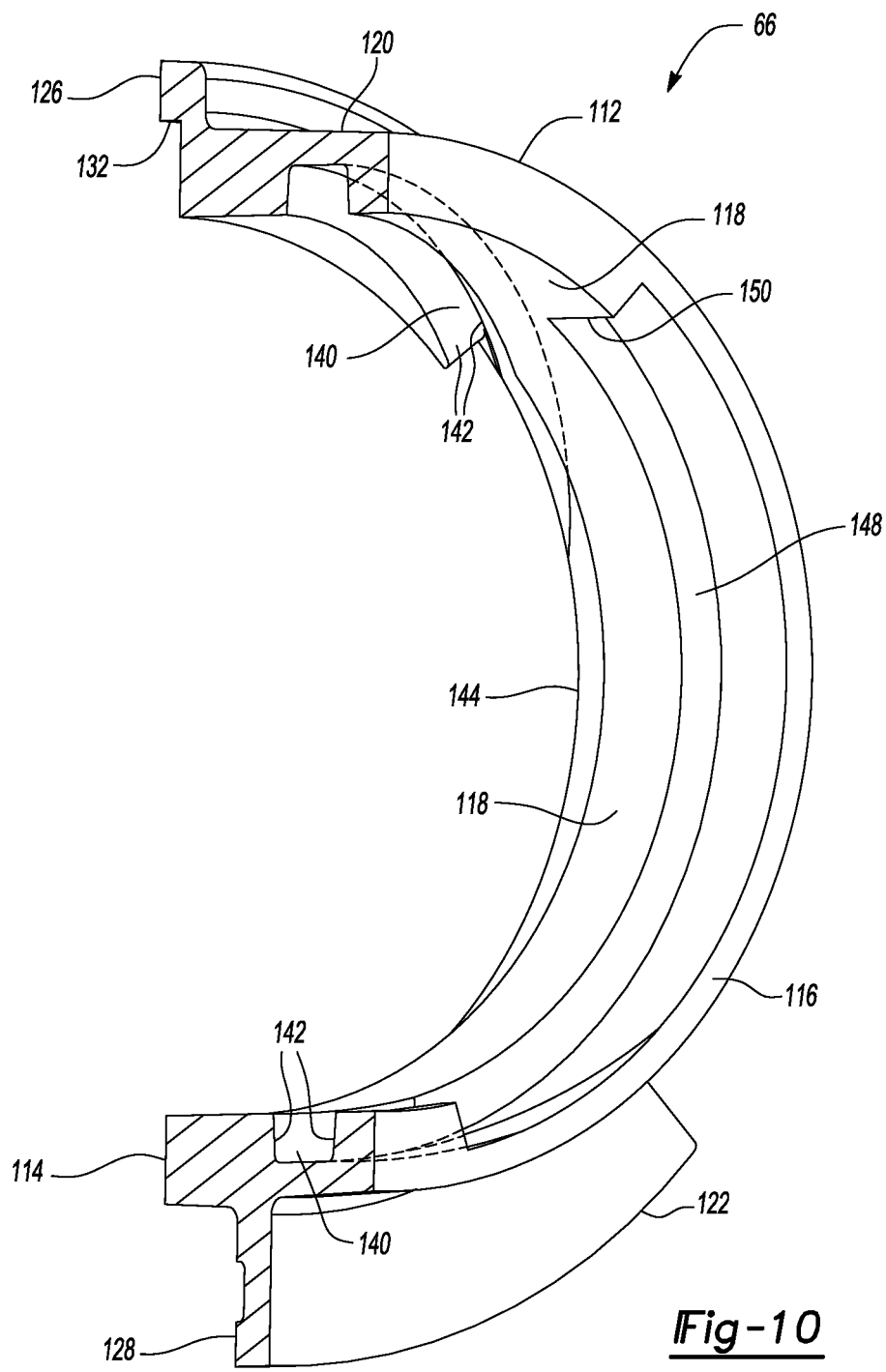
FIG. 10 is a sectioned perspective view of the shift collar in the actuation assembly of FIG. 2 illustrating the internal threads on the shift collar.
Figure 11:
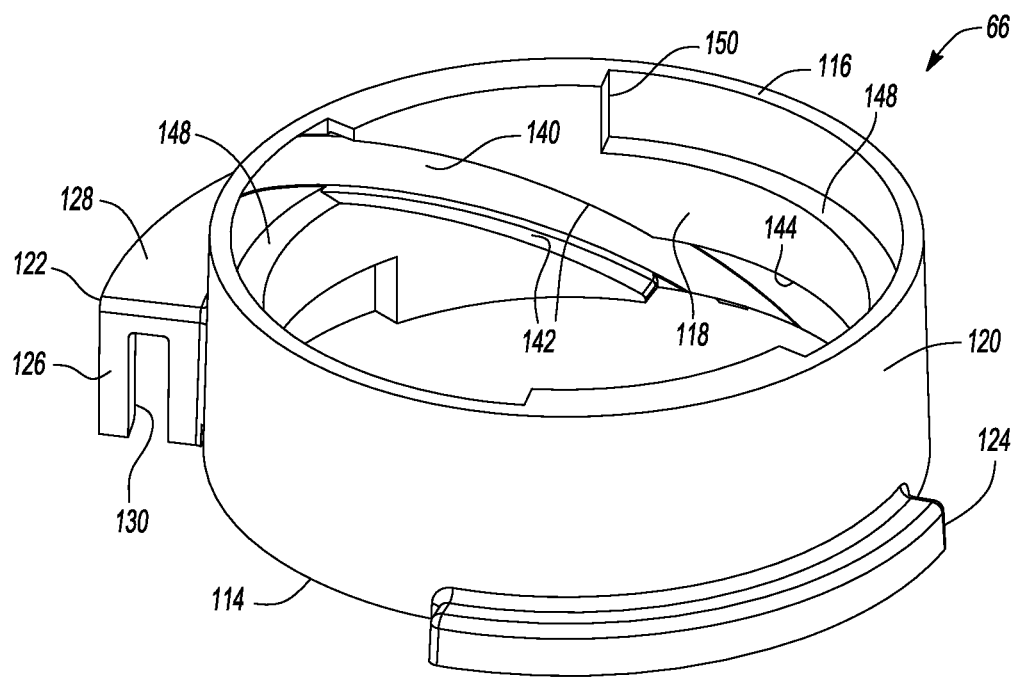
FIG. 11 is a perspective view of the shift collar in the actuation assembly of FIG. 2 illustrating one of the internal threads on the shift collar.

Referring now to FIGS. 2-7, 17, and 18, the dual drive gear 54 further includes a pair of tabs 190 projecting from the inner surface 172 of the dual drive gear hub 154, and a pair of end stops 192 projecting from the first axial end face 162 of the annular disk 152. As best shown in FIGS. 6 and 7, the tabs 190 on the dual drive gear hub 154 engage the annular slot 84 on the support 62 to retain the dual drive gear 54 on the support 62. To insert the tabs 90 into the annular slot 84, the dual drive gear 54 is first positioned relative to the support 62 such that the tabs 190 are aligned with the axial slots 82 in the support 62 as shown in FIG. 6. The dual drive gear 54 is then slid onto the hollow cylindrical body 72 of the support 62 until the tabs 190 are received in the axial slots 82 and are aligned with the annular slot 84. The dual drive gear 54 is then rotated so that the tabs 190 are secured within the annular slot 84 as shown in FIG. 7.

As best shown in FIGS. 17 and 18, the end stops 192 on the dual drive gear 54 engage a second reduction gear 194 of the reduction gear set 60 to limit rotational travel of the dual drive gear 54. Each of the end stops 192 on the dual drive gear 54 extend from one of the curved walls 184 on the dual drive gear hub 154 to the outer periphery 160 of the annular disk 152. In addition, each end stop 192 has a curved side surface 196 with a radius of curvature that is approximately equal to that of the second reduction gear 194 such that each end stop 192 contacts multiple ones of teeth 198 on the second reduction gear 194 at the same time.

Referring now to FIGS. 4, 5, 15, and 16, the dual drive gear 54 further includes a pair of spring actuators 200 and a pair of travel stops 202 projecting from the second axial end face 164 of the annular disk 152. Each of the spring actuators 200 includes a curved wall 204 that is parallel to and spaced radially inward from the first curved wall section 188-1 of the sense plate 156. Each of the travel stops 202 includes a flat wall 206 that extends radially inward from one of the curved wall sections 188 of the sense plate 156 and abuts one of the spring actuators 200.

Figure 16:
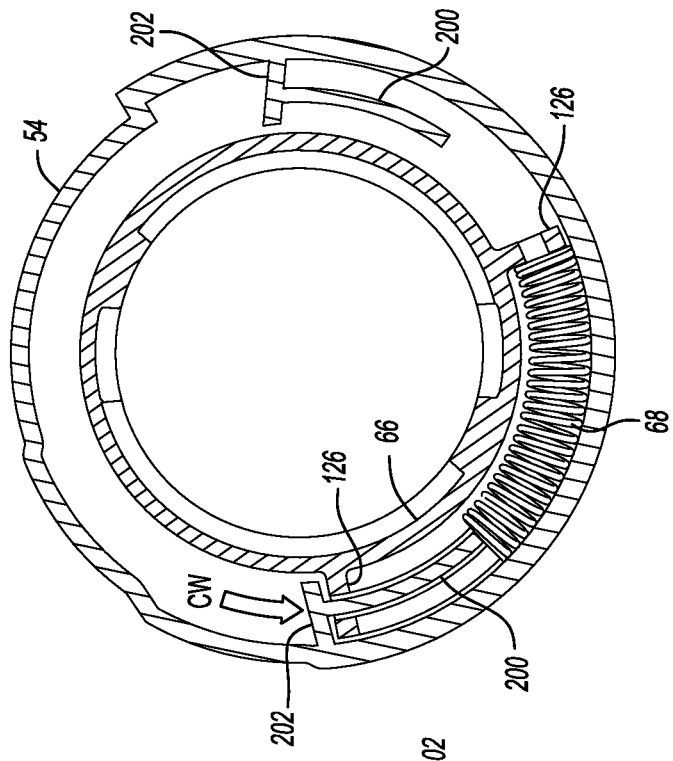
FIGS. 15 and 16 are section views of the dual drive gear, the shift collar, and a compression spring in the actuation assembly of FIG. 2 illustrating torque transfer from the dual drive gear to the shift collar through the compression spring.
Figure 15:
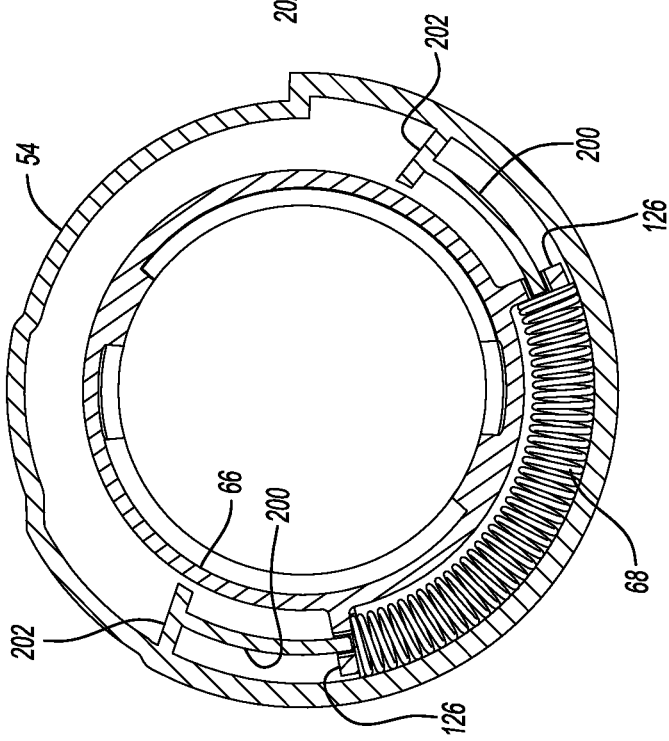

As shown in FIGS. 15 and 16, the spring actuators 200 on the dual drive gear 54 extend through the open-ended slots 130 in the forks 126 of the spring retaining bracket 122 on the shift collar 66. As the dual drive gear 54 rotates, the spring actuators 200 on the dual drive gear 54 compress the compression spring 68 as shown in FIG. 16, and thereby transfer torque from the dual drive gear 54 to the shift collar 66, which causes the shift collar 66 to rotate. Transferring torque from the dual drive gear 54 to the shift collar 66 through the compression spring 68 prevents undesirable gear tooth clash or shift blocking that may otherwise occur during a range shift. The travel stops 202 on the dual drive gear 54 engage the forks 126 on the shift collar 66 to limit the amount by which the dual drive gear 54 can rotate relative to the shift collar 66.

Referring now to FIGS. 1A, 1B, and 2, the mode clutch actuator 56 converts the rotational force (or torque) of the dual drive gear 54 into an axial force that is applied to the mode clutch 28 to shift the mode of the EMOD transfer case 10 (e.g., between 2 WD and 4 WD). The mode clutch actuator 56 includes a base cam 208 and an applied cam 210. The base cam 208 includes an annular body 212, and the applied cam 210 includes an annular body 214 and a pair of bosses 216 projecting radially outward from the annular body 214. When the dual drive gear 54 rotates within a certain angular range, the edges 186 on the curved walls 184 of the dual drive gear hub 154 engage or disengage the bosses 216 on the applied cam 210. In turn, the applied cam 210 rotates relative to the base cam 208, which causes the applied cam 210 to move in one of the first and second axial directions A1 or A2 depending on the direction of rotation. Further discussion of clutch actuators that are similar or identical to the mode clutch actuator 56 can be found in U.S. Patent Pub. No. 2015/0158383, which is incorporated herein by reference (see clutch actuators 388, 488 in FIGS. 8, 9 and 11 of the '383 publication).

With additional reference to FIGS. 17 and 18, the reduction gear set 60 couples the dual drive gear 54 to the shift motor 58. The reduction gear set 60 comprises a plurality of reduction gears 218 including the first reduction gear 170 and the second reduction gear 194. The shift motor 58 drives the reduction gears 218 to rotate the dual drive gear 54, and thereby shift the range and mode of the EMOD transfer case 10, in response to a control signal from an electronic controller.

Referring now to FIGS. 1B, 2-5, 8, and 9, operation of the EMOD transfer case 10 will now be described in detail. When the shift collar 66 is oriented so that the protrusions 100 on the shift fork 64 engage the second end stops 150 on the inner surface 118 of the shift collar 66, the EMOD transfer case 10 is in 4 WD high. Then, when the shift motor 58 rotates the dual drive gear 54 in a clockwise direction CW, the dual drive gear 54 rotates the shift collar 66 in the clockwise direction CW through the compression spring 68. In turn, the protrusions 100 on the shift fork 64 travel along the second ledges 148 on the inner surface 118 of the shift collar 66. As this occurs, the curved walls 184 on the dual drive gear 54 disengage from the bosses 216 on the applied cam 210, causing the applied cam 210 to rotate in the clockwise direction CW relative to the base cam 208. In turn, the applied cam 210 moves toward the base cam 208 in the second axial direction A2, which release the mode clutch 28 and thereby shifts the mode of the EMOD transfer case 10 from 4 WD to 2 WD. As a result, the EMOD transfer case 10 is in 2 WD high.

As the shift collar 66 continues to rotate in the clockwise direction CW, the protrusions 100 on the shift fork 64 transition from engaging the second ledges 148 on the shift collar 66 to engaging the internal threads 140 on the shift collar 66. When the protrusions 100 on the shift fork 64 travel along the internal threads 140 on the shift collar 66 as the shift collar 66 rotates in the clockwise direction CW, the shift fork 64 and the reduction hub 26 move in the first axial direction A1. In turn, the external splines 38 on the reduction hub 26 disengage from the internal splines 40 on the input shaft 12. As a result, the range of the EMOD transfer case 10 shifts from low to neutral.

As the protrusions 100 on the shift fork 64 continue to travel along the internal threads 140 on the shift collar 66 as the shift collar 66 rotates in the clockwise direction CW, the shift fork 64 and the reduction hub 26 continue to move in the first axial direction A1. In turn, the external splines 38 on the reduction hub 26 engage the internal splines 42 on the carrier gear 34. As a result, the range of the EMOD transfer case 10 shifts from neutral to low. Thus, the EMOD transfer case 10 is in 2 WD low.

As the shift collar 66 continues to rotate in the clockwise direction CW, the protrusions 100 on the shift fork 64 transition from engaging the internal threads 140 on the shift collar 66 to engaging the first ledges 144 on the inner surface 118 of the shift collar 66. When the protrusions 100 on the shift fork 64 travel along the first ledges 144 on the shift collar 66, the curved walls 184 on the dual drive gear 54 engage the bosses 216 on the applied cam 210, causing the applied cam 210 to rotate in the clockwise direction CW relative to the base cam 208. In turn, the applied cam 210 moves away from the base cam 208 in the first axial direction A2, which applies the mode clutch 28 and thereby shifts the mode of the EMOD transfer case 10 from 2 WD to 4 WD. Thus, when the protrusions 100 on the shift fork 64 engage the first end stops 146 on the inner surface 118 of the shift collar 66, the EMOD transfer case 10 is in 4 WD low.

The process described above can be reversed by controlling the shift motor 58 to rotate the dual drive gear 54 in a counterclockwise direction CCW to shift the EMOD transfer case 10 from 4 WD low, to 2 WD low, to neutral, to 2 WD high, and finally to 4 WD high.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A transfer case comprising:
a support including a base configured to be fixed to a housing of the transfer case and a hollow cylindrical body projecting from the base in a first axial direction, the hollow cylindrical body defining a pair of axial slots that extend in the first axial direction;
a shift fork including an arc-shaped body and a pair of protrusions projecting radially outward in opposite directions from the arc-shaped body, the protrusions being configured to extend through the axial slots in the hollow cylindrical body of the support;
a reduction hub including a pair of flanges defining an annular groove configured to receive the arc-shaped body of the shift fork, internal splines configured to engage a first output shaft, and external splines configured to engage one of an input shaft and a carrier gear coupled to the input shaft through a planetary gear;
a shift collar including an annular body having an inner surface and an outer surface, the inner surface defining a pair of internal threads configured to receive distal ends of the protrusions on the shift fork;
a dual drive gear including an annular disk having a plurality of teeth disposed along an outer periphery thereof and configured to engage a reduction gear driven by a shift motor; and
a dual drive gear hub including an annular wall disposed around an inner periphery of the annular disk and a pair of curved walls projecting from the annular wall in the first axial direction and configured to actuate a mode clutch actuator of the transfer case to engage or disengage a second output shaft;
wherein each of the distal ends of the protrusions on the shift fork have a pair of opposing chamfered edges configured to engages a pair of opposing ramped surfaces of one of the internal threads on the shift collar.

2. The transfer case of claim 1 further comprising a sense plate projecting from the annular disk in a second axial direction opposite of the first axial direction and extending around the outer periphery of the annular disk.

3. The transfer case of claim 2 wherein the dual drive gear further includes a spring actuator and a travel stop projecting from the annular disk in the second axial direction, the spring actuator including a curved wall that is parallel to and spaced radially inward from the sense plate, the travel stop including a flat wall that extends radially inward from the sense plate and abuts the spring actuator.

4. The transfer case of claim 3 wherein the dual drive gear, the dual drive gear hub, and the sense plate are unitarily and integrally formed.

5. The transfer case of claim 3 further comprising a compression spring configured to transfer torque from the dual drive gear to the shift collar.

6. The transfer case of claim 5, wherein the shift collar includes a bracket configured to retain the compression spring around the outer surface of the annular body of the shift collar, the bracket including a fork that defines an open-ended slot that is configured to receive the spring actuator on the dual drive gear.

7. The transfer case of claim 5, wherein the travel stop on the dual drive gear is configured to engage the fork on the shift collar to limit rotation of the dual drive gear relative to the shift collar.

8. The transfer case of claim 1 wherein the dual drive gear hub includes a pair of tabs that project radially inward from the annular wall and configured to engage an annular slot on an outer surface of the hollow cylindrical body of the support to retain the dual drive gear on the support.

9. A transfer case comprising:
a support including a base configured to be fixed to a housing of the transfer case and a hollow cylindrical body projecting from the base in a first axial direction, the hollow cylindrical body defining a pair of axial slots that extend in the first axial direction;
a shift fork including an arc-shaped body and a pair of protrusions projecting radially outward in opposite directions from the arc-shaped body, the protrusions being configured to extend through the axial slots in the hollow cylindrical body of the support;
a reduction hub including a pair of flanges defining an annular groove configured to receive the arc-shaped body of the shift fork, internal splines configured to engage a first output shaft, and external splines configured to engage one of an input shaft and a carrier gear coupled to the input shaft through a planetary gear;
a shift collar including an annular body having an inner surface and an outer surface, the inner surface defining a pair of internal threads configured to receive distal ends of the protrusions on the shift fork;
a dual drive gear including an annular disk having a plurality of teeth disposed along an outer periphery thereof and configured to engage a reduction gear driven by a shift motor;
a dual drive gear hub including an annular wall disposed around an inner periphery of the annular disk and a pair of curved walls projecting from the annular wall in the first axial direction and configured to actuate a mode clutch actuator of the transfer case to engage or disengage a second output shaft; and
a sense plate projecting from the annular disk in a second axial direction opposite of the first axial direction and extending around the outer periphery of the annular disk;
wherein the dual drive gear further includes a spring actuator and a travel stop projecting from the annular disk in the second axial direction, the spring actuator including a curved wall that is parallel to and spaced radially inward from the sense plate, the travel stop including a flat wall that extends radially inward from the sense plate and abuts the spring actuator.

10. The transfer case of claim 9 wherein the dual drive gear, the dual drive gear hub, and the sense plate are unitarily and integrally formed.

11. The transfer case of claim 9 further comprising a compression spring configured to transfer torque from the dual drive gear to the shift collar.

12. The transfer case of claim 11, wherein the shift collar includes a bracket configured to retain the compression spring around the outer surface of the annular body of the shift collar, the bracket including a fork that defines an open-ended slot that is configured to receive the spring actuator on the dual drive gear.

13. The transfer case of claim 12, wherein the travel stop on the dual drive gear is configured to engage the fork on the shift collar to limit rotation of the dual drive gear relative to the shift collar.

14. The transfer case of claim 9 wherein the dual drive gear hub includes a pair of tabs that project radially inward from the annular wall and configured to engage an annular slot on an outer surface of the hollow cylindrical body of the support to retain the dual drive gear on the support.

15. A transfer case comprising:
- a support including a base configured to be fixed to a housing of the transfer case and a hollow cylindrical body projecting from the base in a first axial direction, the hollow cylindrical body defining a pair of axial slots that extend in the first axial direction;
- a shift fork including an arc-shaped body and a pair of protrusions projecting radially outward in opposite directions from the arc-shaped body, the protrusions being configured to extend through the axial slots in the hollow cylindrical body of the support;
- a reduction hub including a pair of flanges defining an annular groove configured to receive the arc-shaped body of the shift fork, internal splines configured to engage a first output shaft, and external splines configured to engage one of an input shaft and a carrier gear coupled to the input shaft through a planetary gear;
- a shift collar including an annular body having an inner surface and an outer surface, the inner surface defining a pair of internal threads configured to receive distal ends of the protrusions on the shift fork;
- a dual drive gear including an annular disk having a plurality of teeth disposed along an outer periphery thereof and configured to engage a reduction gear driven by a shift motor; and
- a dual drive gear hub including an annular wall disposed around an inner periphery of the annular disk and a pair of curved walls projecting from the annular wall in the first axial direction and configured to actuate a mode clutch actuator of the transfer case to engage or disengage a second output shaft;

wherein the dual drive gear hub includes a pair of tabs that project radially inward from the annular wall and configured to engage an annular slot on an outer surface of the hollow cylindrical body of the support to retain the dual drive gear on the support.

* * * * *